Dec. 29, 1936.  C. H. SAND, JR  2,065,539
MULTIPLE COLUMN LISTING DEVICE
Filed March 12, 1935   6 Sheets-Sheet 4

INVENTOR.
Charles H. Sand, Jr.
BY
Bates, Golrick & Teare
ATTORNEYS.

Dec. 29, 1936. C. H. SAND, JR 2,065,539
MULTIPLE COLUMN LISTING DEVICE
Filed March 12, 1935 6 Sheets-Sheet 5

INVENTOR.
Charles H. Sand, Jr.
BY
ATTORNEYS.

Dec. 29, 1936.  C. H. SAND, JR  2,065,539
MULTIPLE COLUMN LISTING DEVICE
Filed March 12, 1935  6 Sheets-Sheet 6

INVENTOR.
Charles H. Sand Jr.
BY
Bates, Goldrick & Fears
ATTORNEYS.

Patented Dec. 29, 1936

2,065,539

UNITED STATES PATENT OFFICE 2,065,539

MULTIPLE COLUMN LISTING DEVICE

Charles H. Sand, Jr., Willoughby, Ohio, assignor, by mesne assignments, to Addressograph-Multigraph Corporation, Cleveland, Ohio, a corporation of Delaware Application March 12, 1935, Serial No. 10,616

24 Claims. (Cl. 101—47)

This invention relates to a method of printing in multi-columns from a single column printing member, and to a mechanism for carrying out such method, which mechanism may be readily attached to existing machines and automatically operated to enable multi-column imprints to be made. These, therefore, are the general objects of the present invention.

The present invention contemplates the provision of a listing mechanism which is automatically operated to move the sheet to be printed in such a manner that a multiple column list may be made from single column printing members and wherein a sheet of a length comparatively long in relation to a card, may be conveniently imprinted without the use of a sheet feeding and retaining mechanism of great size.

Heretofore listing has been accomplished on cards and relatively small sheets by mounting the card or sheet on a carriage, which was manually moved in two directions to properly position the sheet. The method requires the use of a carriage substantially as large as the work sheet or at least capable of a total movement equivalent to size of that part of the sheet to be printed. Obviously, this is a decided disadvantage as, for sheets of any material size the mechanism becomes cumbersome and unwieldly. To overcome this disadvantage, the present invention proposes to mount the sheet in a carriage, which is movable in a direction parallel with the width or narrow dimension of the sheet to feed the sheet in one direction, and to feed the sheet independent of the movement of the carriage to feed the sheet in the other direction, parallel with the length or long dimension of the sheet.

Other objects of the invention, for instance the automatic stopping of the mechanism when a predetermined number of printing members have made their impressions on the sheet, will become more apparent from the following specification, reference being had to the accompanying drawings which illustrate a preferred form of the invention.

The invention includes an improved method and apparatus for making multiple column impressions from single column printing members. Such method comprises feeding printing plates, having data arranged thereon in single column formation, one at a time, to a printing position; positioning a sheet to be printed over a positioned printing member and making an impression of a selected line thereof on the sheet; moving the sheet transversely and longitudinally to bring a second column of the sheet over the printing member, whereby other lines thereof will lie in alignment with and at one side of the first impression; making a second impression from such other lines; moving such printing member from the printing position and another printing member into printing position; moving the sheet transversely and longitudinally to bring a new area thereof into printing position, such area being below and in longitudinal column formation with the first area impressed from the preceding printing member; making an impression from lines of such printing member; moving the sheet lengthwise and transversely to enable the printing of other lines thereof below and in column formation relative to the second impression of the preceding printing member and in lateral alignment with the printing lines previously impressed by the same printing member; making an impression of such lines; bringing in a third printing member into position and repeating the steps until either the supply of printing members has been exhausted or the end of the sheet has been reached.

The method above set forth will become more apparent from the following description of an improved listing mechanism, so arranged that it may be used as an attachment for existing printing machines or incorporated as a unit in printing machines to be built.

Referring now to the drawings, the listing mechanism is shown as an attachment to a printing machine of the general type commonly known as an "addressing machine". However, it is obvious that the invention may be incorporated in other types of printing mechanism. The printing or addressing machine illustrated in the drawings has been chosen because of its special adaptability to the present invention. As illustrated, the printing machine includes a frame 10, which supports a printing device magazine M, a platen mechanism P, together with suitable mechanism to feed the printing devices one at a time across the machine from the magazine to an anvil located below the platen. The impressions are made through a suitable inked ribbon R, which is disposed between the printing device and the work sheet in the usual manner.

The printing devices are stacked in the magazine M by the operator, and are successively withdrawn therefrom and progressed along a guideway 20 by pawls 21, suitably mounted on feed bars 22. The feed bars 22 are carried by flanged rollers 23, which are rotatable on studs carried by the side walls of the guideway.

Figure 2:
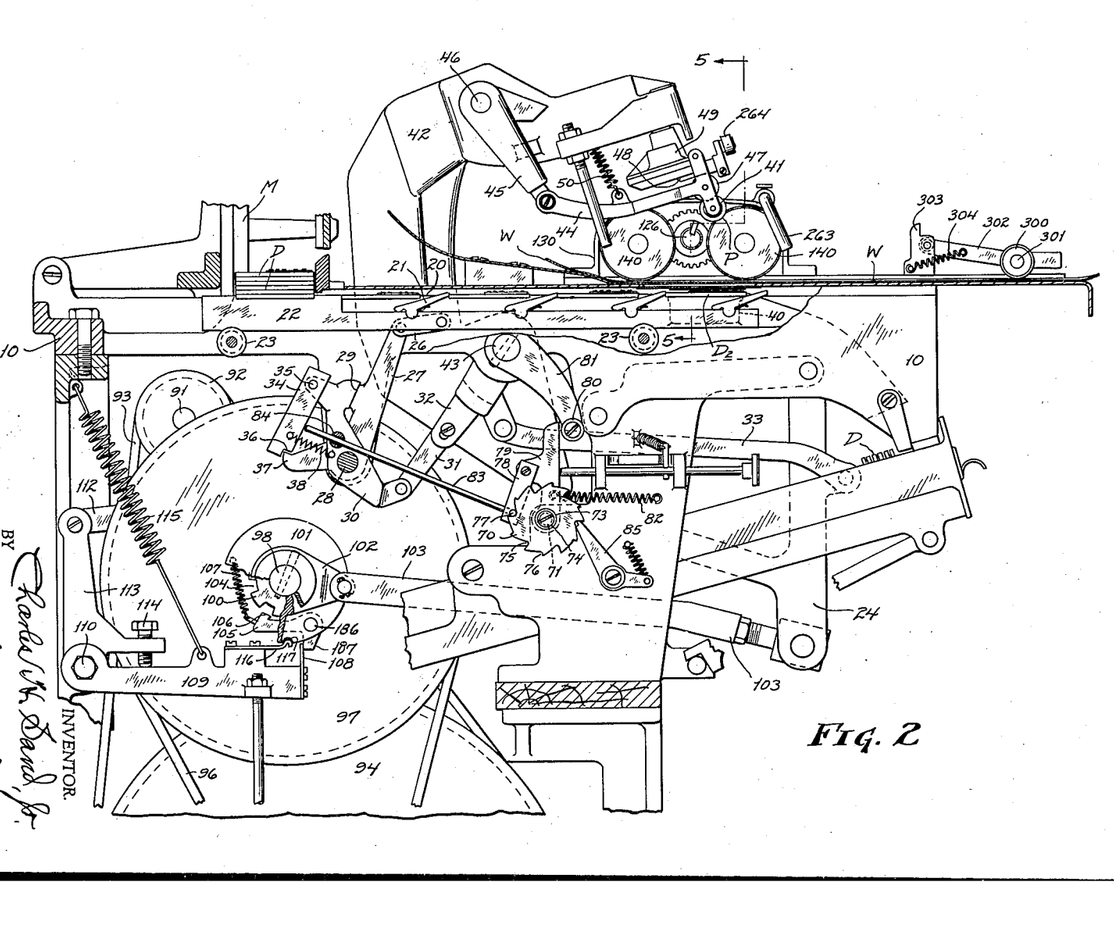
Fig. 2 is a vertical section as indicated by the lines 2—2 on Fig. 1.

The feed bars are reciprocated, as shown in Fig. 2, by a drive rocker 24, which is swingably journalled on a shaft 25 carried by the main frame 10 and which is oscillated as hereinafter described. Connected to the feed bars 22, by a link 26, is a bell crank 27, which is journalled on a shaft 28 carried by the frame 10. The bell crank 27 is arranged to be swung in a clockwise direction (Fig. 2) to progress the printing devices from the magazine M to an anvil 40, below the platen. The bell crank 27 is swung by a bell crank 30, which is pivotally mounted on the shaft 28 and which is operatively connected to the rocker 24 by a link 31, a bell crank 32 and a second link 33.

The bell crank 27 is swung in a counter-clockwise direction to withdraw the feed bars 22 and position them for the advancement of the next printing device. The arrangement is such, however, that the feed bars 22 may be moved once for a definite plurality of operations of rock arm 24. As shown in Fig. 2, the counter-clockwise movement of the bell crank 27 is controlled by a pawl 34, pivoted at one end as at 35, to the bell crank 30, and provided, at its other end, with a notch 36, arranged to engage an arm 37 of the bell crank 27. A suitable spring 38 serves to normally maintain the pawl 34 in contact with the bell crank 27. However, the pawl may be moved out of engagement therewith as will be hereinafter more fully explained.

The arrangement, above described, is such that when the driving arm 24 swings in a clockwise direction, the pawl 34 being in its normal position, the feed bar will be drawn rearwardly (towards the left in Fig. 2), and when the rock arm 24 is swung in a counter-clockwise direction, the feed bar will be drawn forwardly (towards the right). During the latter or forward movement of the feed bars, the pawls 21 engage the printing devices in the guideway and advance them step by step from the magazine to a position above the anvil 40, in which position the printing device D2 in Fig. 2 is shown.

The platen P is of the roller type and is mounted in an oscillatable arm. The arm is oscillated to bring the platen into contact with the paper, superimposed above the printing device D2 of Fig. 2, and apply printing pressure thereto and then roll the platen across the printing device, whereupon the platen arm is oscillated to raise the platen out of contact with the printing device and the paper.

The platen comprises a roller 41 carried by an arm 42 mounted on a shaft 43 journalled in the frame 10. The roller 41 is journalled in a bracket 44 pivotally mounted on a lever 45 carried by a shaft 46, which is rotatably supported in the platen arm 42. Journalled in the bracket 44, in contact with the platen 41, are a series of rollers 47, which are maintained in contact, by a spring 50, with respective pressure bars 48 carried by the head 49 of the platen arm.

Figures 3, 4:
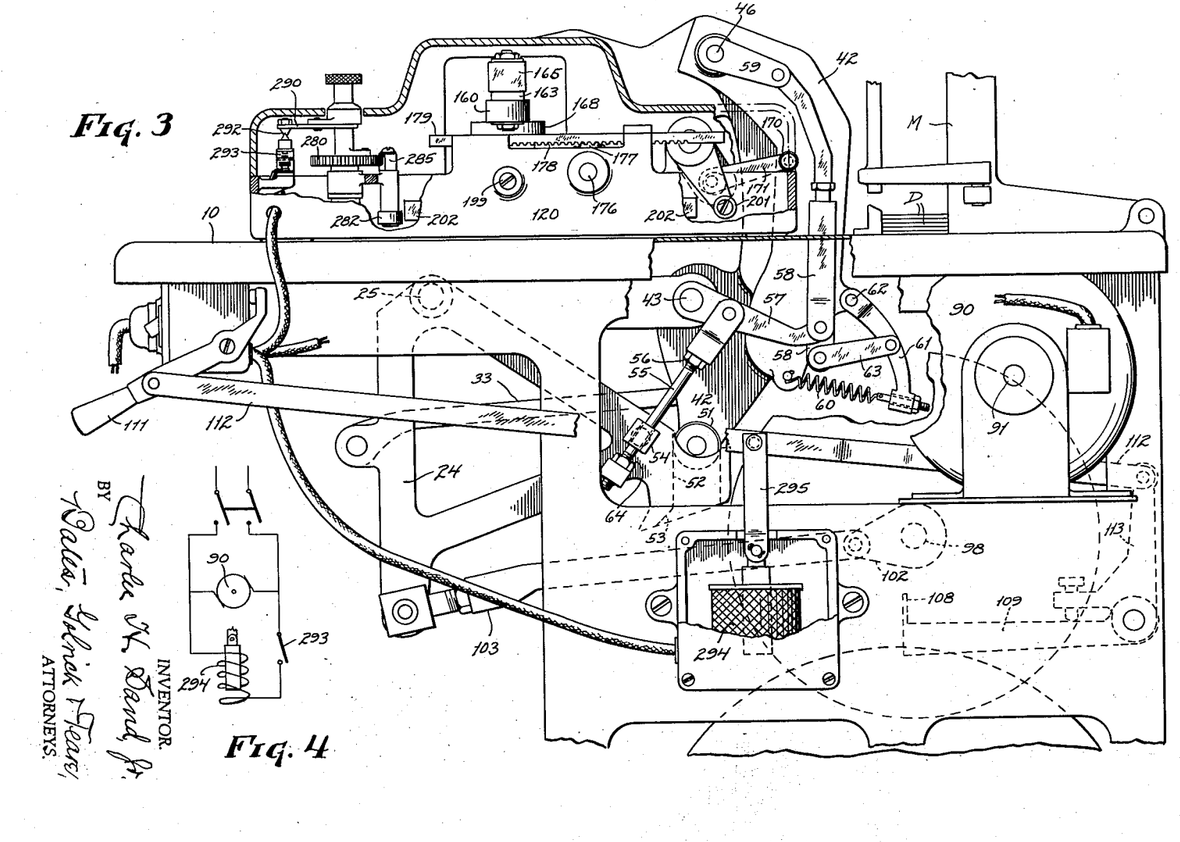
Fig. 3 is a side elevation as viewed from the right of Fig. 1, certain frame parts being broken away to more fully illustrate the internal construction of the mechanism.
Fig. 4 is a diagram of the electric circuits utilized in the stop mechanism.

The platen arm is oscillated by the drive rocker 24 to move the platen 41 into and out of contact with the work sheet W. As shown in Fig. 3, the platen arm extends below its supporting shaft 43 and is provided adjacent its lower end with a roller 51 arranged to be engaged by a cam slot 52 formed in the rocker 24. Hence, the platen will be oscillated consequent upon the swinging of the drive rocker.

After the platen arm has been oscillated to move the platen into contact with the work sheet above the printing device, and printing pressure applied thereto by reason of the cam 52, the platen arm is retained in position by an arcuate surface 53 of the cam slot 52, and the platen is rolled rearwardly toward the right in Fig. 3 or toward the left in Fig. 2, across the printing device. As shown in Fig. 3 pivotally mounted on the rock arm 24, is a block 54 in which a rod 55 is slidably mounted. When the roller 51 of the platen arm is first engaged by the arcuate surface 53 of the cam, the upper surface of the block 54 engages a shoulder 56 formed on the rod 55, thereby rocking a lever 57 to which the upper end of the rod 55 is pivoted. The lever 57 is pivotally mounted on the shaft 43 and is connected through a link 58 with a rock arm 59, rigidly mounted on the shaft 46, heretofore mentioned, thereby rocking the lever 45 in a clockwise direction (Fig. 2) drawing the bracket 44 rearwardly and rolling the platen 41 across the printing device.

To prevent smudging of the work sheet, the platen is retained in its rearmost position until it has been raised clear of the work sheet by a spring 60 (Fig. 3). This spring is connected at one end to the platen arm 42 and at its other end to a lever 61 which is pivotally connected to the platen arm at 62 and which is connected by a link 63 to the link 58, heretofore mentioned. Thus the link 63 and the lever 57 form in effect a toggle which is acted on by the spring 60 to maintain the link 58 in its uppermost position until, on the return stroke of the drive rocker 24, a shoulder 64 on the rod 55 is engaged by the block 54 and the lever 57 is rocked to bring the link 58 downwardly, rolling the platen forwardly, whereupon the toggle mechanism is moved to the position shown in Fig. 3, and maintained in such position by the spring 60.

The printing mechanism is arranged so that multiple impressions may be made from each printing device. The number of impressions is controlled by a cam or ratchet 70. Such ratchet is shown in Fig. 2, as being removably and rotatably mounted on a stud 71 but normally held thereon by a collar 73 and a set screw 74. The ratchet shown is arranged to cause the printing mechanism to make two impressions from each printing device. For this purpose the ratchet is provided with a series of notches 75 and 76 alternately disposed on its periphery, the notches 76 being shallower than the notches 75. The ratchet is advanced one notch for each cycle of operation of the platen arm, by a pin 77 carried by a pawl 78 pivotally mounted on a lever 79, which is rotatably journalled on the stud 71. The lever is swung by a roller 80, carried by a rock arm 81 which is rigidly mounted on the shaft 43 to which the platen arm is secured. A suitable spring 82 maintains the lever 79 in engagement with the roller 80. Hence, the ratchet is advanced one notch for each cycle of operation of the platen.

It will be noted that on alternate cycles of operation of the platen arm, the pin 77 of the pawl 78 seats in a shallow notch 76, and is further from the axis of the ratchet than when it seats in a deep notch 75. This positioning of the pin 77 sets the latch 34, heretofore mentioned, to cause the printing devices to be fed or skipped. When the pin 77 seats in a shallow notch, it positions or moves rearwardly a rod 83. This rod is shown in Fig. 2 as slidably mounted at 84 on the frame 10, and is pivotally connected at one end to the pawl 78, the other end being arranged to abut the latch 34. Hence, when the pin 77 lies in a shallow notch, the rod will be moved rearwardly (to the left in Fig. 2) a distance sufficient to cause the latch 34 to be swung about its pivot out of engagement with the bell crank 37, thereby breaking the driving connection to the printing device feed bars 22. A suitable detent pawl 85 serves to maintain the ratchet in position and prevent overthrow.

The drive rocker 24 is driven by a motor 90 which operates through a clutch mechanism, so arranged that the platen of the printing mechanism, when stopped, will come to rest in the raised position shown in Fig. 2. The motor shaft 91 is provided with a driving pulley 92, which, through a suitable belt 93, drives the pulley 94, which in turn, through a smaller pulley 95 integral therewith and a driving belt 96 operates to rotate a driving pulley 97, journalled on a shaft 98 supported by the machine frame 10. Rigidly secured to the pulley 97 is one member 100, of the clutch mechanism, the other member 101 of which carries a crank arm 102. Such crank is connected by a link 103 with the drive rocker 24, thereby oscillating such rocker, once for each revolution of the pulley 97 continuously as long as the clutch members 100 and 101 are in active engagement with each other.

The clutch member 100 comprises a disc provided with a series of notches 104 about its periphery. These notches are arranged to be engaged by a latch 105 pivotally mounted as at 186 on the clutch member 101. A suitable spring 107, interposed between the latch 105 and the clutch member 101, acts to cause the nose 106 of the latch to be normally moved into cooperation with one of the notches 104, whereby the rotation of the clutch member 100 will rotate the member 101, and thereby oscillate the drive rocker 24.

When it is desired to stop the operation of the printing mechanism, the connection between the clutch member 100 and the clutch member 101 is broken. As shown in Fig. 2, the latch 105 is provided with a radially projecting lug 187, arranged to be engaged by a movable abutment 108, carried by a lever 109, which is pivoted to the frame 10, as at 110. When it is desired to stop the machine, the operator depresses a lever 111 (Fig. 3) conveniently located adjacent the front of the machine, which, through a link 112, rocks a bell crank 113 in a counter-clockwise direction (Fig. 2) permitting a spring 115 to drag the lever 109 upwardly in a counter-clockwise direction, raising the abutment 108 into the path of the latch 105 which rotates with the clutch member 101. Hence, when the latch strikes the abutment, it will be withdrawn from the cooperating notch 104, disengaging the member 101 from the driving clutch member 100. A suitable resilient member 116 carried by the lever 109 is arranged to engage a recess 117 in the clutch member 101, and act as a brake and centering device preventing the overthrow of the crank 102 and consequently the drive rocker 24.

In general, the mechanism just described, automatically feeds printing devices one at a time to a printing position and causes the platen to cooperate twice with each printing device. Obviously, various forms of printing mechanism may be used to carry out the method of this invention, other than that described.

Figure 6:
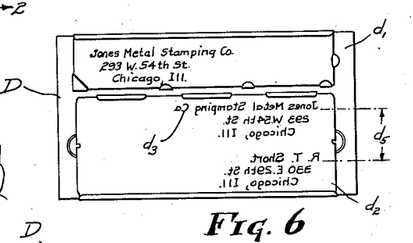
Figs. 6 and 7 are plan views of two types of printing members, each having data thereon in single column formation, such printing members being especially arranged for use in conjunction with the printing mechanism illustrated in Figs. 1 to 5, inclusive.
Figure 7:
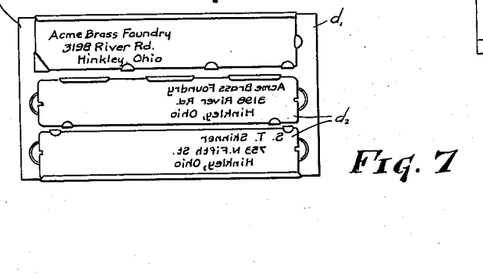
Figure 8:
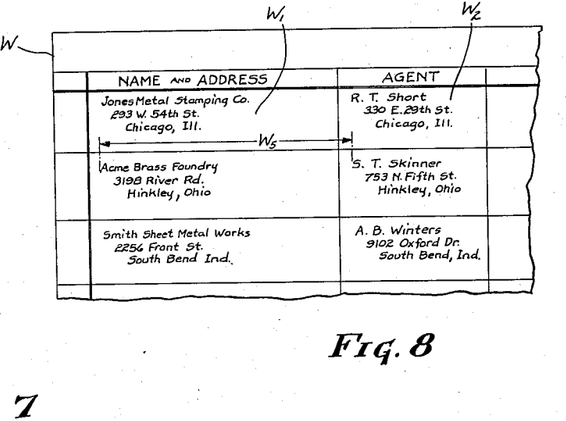
Fig. 8 is a diagrammatic illustration of a worksheet printed by the mechanism illustrated.

Two forms of printing members or devices which may be used in connection with this invention are illustrated in Figs. 6 and 7. As there shown, each printing device comprises plate-like holder $d1$, arranged to retain thereon a printing plate $d2$, which, for instance, may be a metallic plate, having embossed printing characters $d3$ thereon. In Fig. 7 there are two such plates, one above the other. It will be noted that there are six lines of embossed type or printing characters on each plate illustrated. The present invention contemplates the printing of certain of these lines in one column of a work sheet, and printing certain other of these lines in a second column. Referring to Fig. 8, the work sheet there shown is provided with two columns, namely, the column W1 and the column W2. It will be noted that the first three lines of printing characters $d3$ on the printing plate shown in Fig. 6 have been impressed in the column W1, whereas the next three lines of printing characters have been impressed in the column W2. Likewise, it will be noted that the first three lines of the printing characters of the plate shown in Fig. 7 have been printed in the column W1, and the second three lines have been impressed in the column W2. This column arrangement is an example of the attained result by the present method and mechanism. Such mechanism is about to be described in detail.

The lister attachment or mechanism is preferably carried in a box-like frame member 120 which is pivotally mounted on a pin 121 carried by the frame or table of the printing mechanism, and is secured in place against movement thereon by suitable bolts 122, which threadingly engage the table and pass through slotted openings 123, in the bottom wall of the frame 120. An eccentric pin 124 is secured to the table 10 and so arranged that by adjusting the eccentricity of the pin the frame member 120, together with the lister mechanism, may be swung about its pivot 121 to accurately position the lister and the paper gripping mechanism carried thereby, relative to the platen of the printing mechanism, and thereby align the printing characters with the sheet to be printed.

The lister frame is preferably mounted on the table of the printing machine at one side of the platen mechanism and has extending therefrom, toward the platen, an operating member or shaft 126, on the platen end of which is mounted a paper or work-holding carriage 130.

Figure 1:
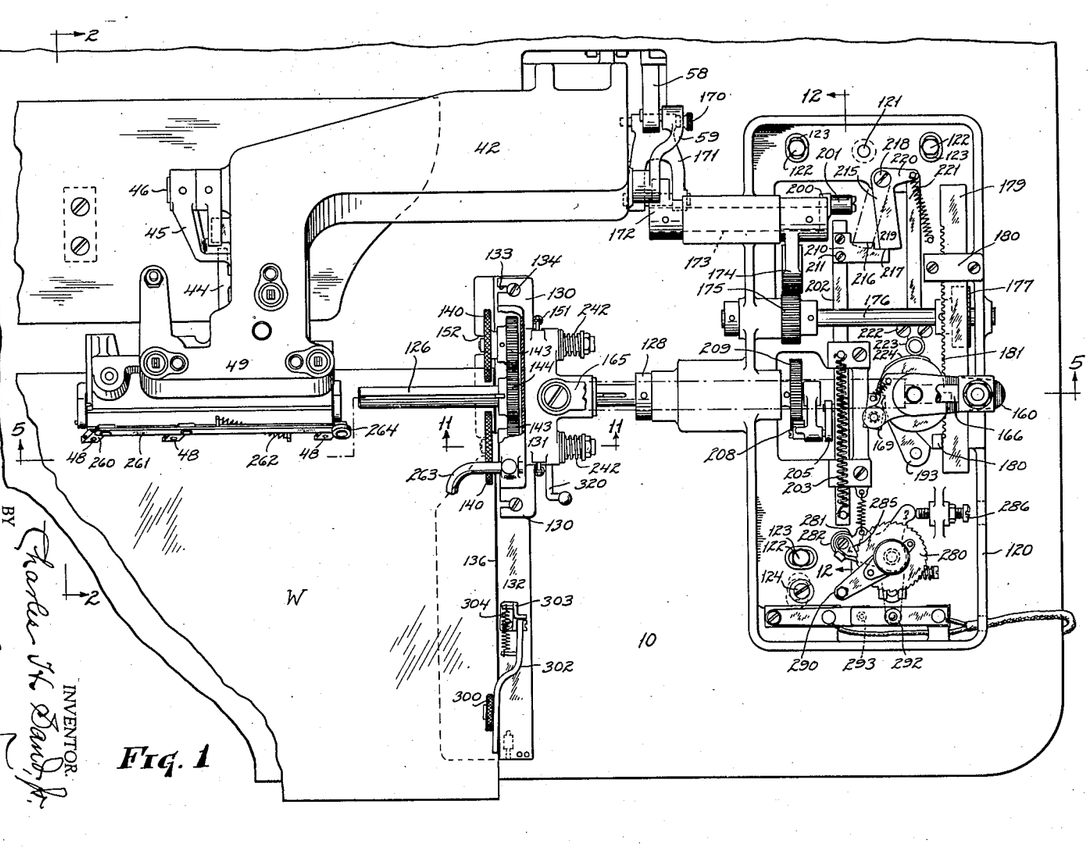
Fig. 1 is a plan view of an improved listing mechanism especially arranged to carry out the method.
Figure 5:
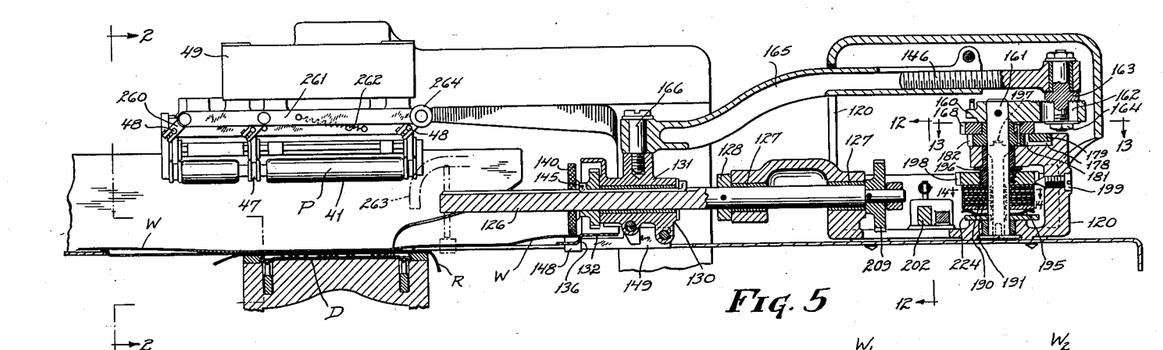
Fig. 5 is a transverse vertical section, as indicated by the offset lines 5—5 on Figs. 1 and 2.

The carriage is mounted on the shaft 126 for sliding movement in a direction parallel with the lines of printing characters. Thus, when the carriage is moved along such a shaft, it will carry different transverse areas of the work sheet into the printing position. The paper carriage supports one edge of the work sheet and comprises, as shown in Figs. 1 and 5, a member 131, slidably mounted on the shaft 126 which is journalled in bearings 127 on the lister housing 120, and prevented from endwise movement relative to such housing by a suitable collar 128 and a ratchet 209 hereinafter to be more fully described.

Figure 11:
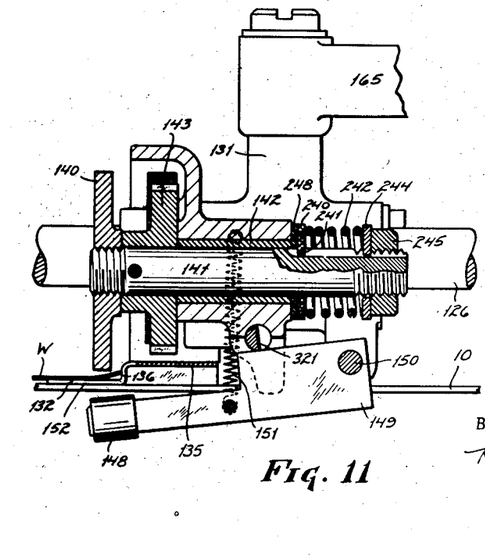
Fig. 11 is a fragmentary sectional view, taken along the line 11—11 on Fig. 1.

Rigidly secured to the carriage member 131 and lying adjacent the top of the table 10 is a guideway 132. As shown in Figs. 1, 5 and 11 the work sheet guideway comprises a plate-like member, having a longitudinally extending shoulder 136, against which the work sheet W may be guided. This guideway extends normal to the shaft 126 and is secured, by suitable screws 134, to the carriage member 131. The screws preferably pass through slotted openings 133 in the member to provide for an adjustment to insure proper alignment of the work sheet.

The work sheet is fed along the guideway 132, transversely of the lines of the printing characters, by a pair of rollers 140, which engage the upper face of the work sheet and, consequent upon their rotation, the sheet is advanced in a direction normal to that of the sliding movement of the carriage. As shown in Fig. 11, each paper feed roller is secured to a shaft 141, which is rotatably mounted in bearings 142 carried by the member 131, and is driven by a gear 143 rigidly secured to the respective shaft 141 and arranged to mesh, as shown in Figs. 1 and 5, with a gear 144, carried by the member 131, and having a splined connection 145 with the shaft 126.

As shown in Fig. 11, the work sheet W is retained in contact with the knurled rollers 140 by suitable rolls 148 carried by a bracket 149 pivoted as at 150 to the carriage 131. The rollers 148 are normally retained in contact with their respective wheels 140 by suitable springs 151, which act to rock the arms 149 about their pivots, the paper guide 132 being provided with cutout portions, as shown at 152 in Fig. 1, to permit contact of the rollers 148 with the knurled wheels 140. However, to permit the insertion of a work sheet, the rollers may be moved downwardly out of contact with their respective rolls 140, by rocking a lever 320 (Fig. 1) which has a cam portion 321 (Fig. 11) arranged to rock the roller supporting bracket downward against the action of the springs 151.

The paper carriage is reciprocated in a direction parallel with the printing lines by a crank 160, which is mounted on a shaft 161, carried in suitable bearings on the lister frame 120. The crank is, as shown in Fig. 5, provided with a slotted opening 162, arranged to engage a crank pin 163 which is adjustably secured to the crank arm by a nut 164, thereby permitting an adjustment of the stroke of the paper carriage. The crank pin 163 is connected to the paper carriage 130 by suitable adjustable link 165, one member of which is pivotally conected as at 166 to the paper carriage 130, the other member of which is pivotally mounted on the crank pin 163, the two members being connected by a suitable threaded connection 146, whereby the length of the link may be adjusted to meet column requirements.

The crank 160 is periodically rotated to reciprocate the paper carriage with an intermittent movement. As shown in Figs. 1 to 5 and 13, the crank 160 is rotated by a ratchet 168, journalled on the vertical shaft 161, and which engages a pawl 169 pivotally mounted as at 167 on the crank 160. The arrangement is such that the carriage is moved once for each column to be printed, that is, twice for two columns, three times for three columns, etc. As shown in the drawings, the mechanism is arranged for two columns. Hence, the paper carriage is mounted to be moved to position the columns into alternate registration with the printing plate. The ratchet shown is provided with two notches and associated abutments 168a. However, were the machine arranged for three column listing, this ratchet would be provided with three such abutments, and so on for any number of columns desired. The ratchet is oscillated by the movement of the platen arm. Hence, the movement of the paper carriage is periodically timed relative to the movement of the platen.

Figure 12:
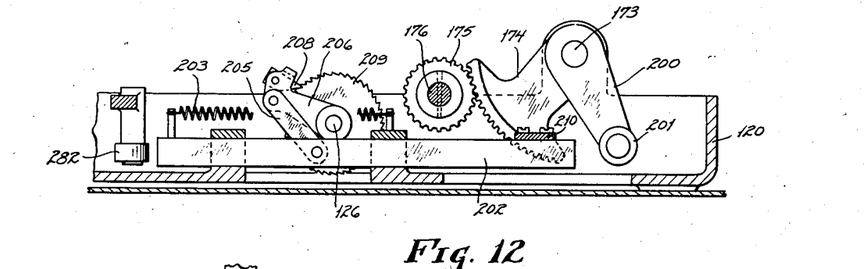
Fig. 12 is a sectional view, the plane of the section being indicated by the line 12—12 on Figs. 1 and 5.
Figure 13:
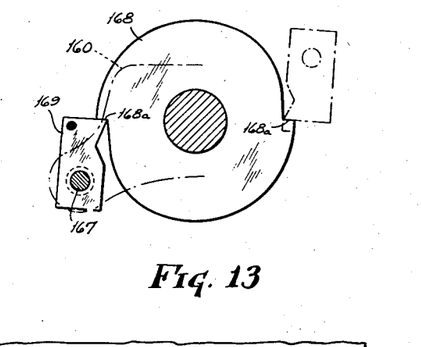
Figs. 13 and 14 are sectional details, as indicated by the correspondingly numbered lines on Fig. 5.

The platen arm, as shown in Figs. 1, 3 and 12, is connected by a removable connection 170 and a link 171 with a crank 172 drivingly secured to a shaft 173 journalled in the lister frame 120. Rigidly secured to the other end of such shaft is a segmental gear member 174, arranged to mesh with a pinion 175, drivingly mounted on a rock shaft 176, journalled in the lister frame member. The shaft 176 is provided with a pinion 177, which meshes with teeth 178 formed in the lower face of a rack bar 179, slidably mounted in suitable brackets 180 of the lister frame. Other teeth 181 on the side of such rack bar engage a pinion 182, drivingly secured to the ratchet 168 and thereby causes the oscillation of the ratchet consequent upon the oscillation of the platen arm. The arrangement is such that the ratchet is swung in a direction to pick up the pawl consequent upon the raising movement of the platen and to remain idle through the lowering or printing movement of the platen.

Figure 14:
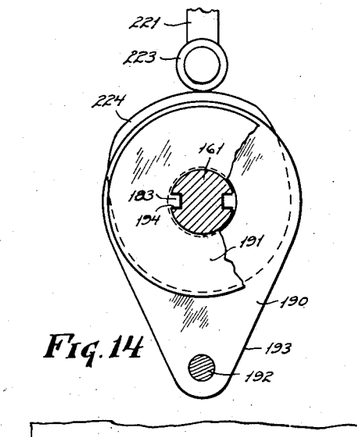

Overthrow of the lister mechanism is prevented by a brake mechanism which is actuated by the shaft 161, to which the carriage shifting crank 160 is secured. This brake mechanism is best illustrated in Figs. 5 and 14, as there shown, a series of alternately disposed friction discs 190 and 191 are mounted on the shaft 161. The discs or disc-like members 190 loosely encircle the shaft and are restrained from rotation by a post 192 which passes through ears 193 of each disc and is secured to the lister frame 120. The discs 191 are provided with ears 183 adapted to seat in vertically extending slots 194 in the shaft and hence rotate with the shaft. A suitable spring 195, disposed beneath the lowermost disc, normally maintains the discs in frictional contact with each other and urges them upwardly as a unit against the lower face of a disc 198. A collar 196 which is keyed as at 197 to the gear 182 heretofore described threadingly engages the disc 198 and is journalled in a bracket of the frame 120 and provides a bearing for the shaft 161. The disc 198 is constrained against rotation by a set screw 199, carried by the frame 120, and which engages teeth formed on the periphery of the disc. As the rack 179 rotates the gear 182 in a counter-clockwise direction to cause the pawl 169 to move the crank 160, it likewise rotates the collar 196, and due to the threaded engagement between the collar and the non-rotating disc 198, the disc moves downwardly along the shaft 161 increasing the pressure between the brake discs 190 and 191, thereby increasing the frictional resistance and providing a very effective brake mechanism. Consequent upon movement of the rack, in the opposite direction, the collar is moved in a reverse direction relieving the pressure between the plates 190 and 191, and therefore materially decreasing the braking action.

The work sheet is advanced longitudinally, that is, in a direction normal to the lines of characters on the printing device, by the feed rollers 140, immediately before each impression is made. However, if desired, this movement may be made simultaneously with the movement of the carriage to position the paper parallel with the lines of printing characters and move the paper in a diagonal direction relative to the printing characters.

Referring again to Figs. 6 and 8, it will be noted that the first impression made on the work sheet in the column W2, is made by the last three lines of printing characters. Hence, to align the second impression made by that printing device, namely an impression of the first three lines, in transverse alignment with the impression made by the last three lines and in the column W1 of the work sheet, it is necessary to advance the work sheet a distance equivalent to that indicated on the printing device illustrated in Fig. 6, by the line $d5$, and to move the work sheet transversely, (longitudinally of the printing characters), a distance equivalent to that indicated by the line W5 in Fig. 8. The latter is accomplished by properly adjusting the position of the crank pin 163 relative to the crank arm 160 as this controls the throw of the paper carriage 130. The former distance $d5$ is controlled by a sliding cam and distance block hereinafter to be described.

After the second impression has been made from one printing device the work sheet is positioned for the first impression from the next succeeding printing device. This is accomplished by the return or right-hand movement (Fig. 5) of the carriage consequent upon the raising of the platen arm following the last impression made from the former printing device.

The feed wheels 140 which feed the work sheet longitudinally, (transversely of the lines of printing characters), are operated to feed the paper consequent upon the printing stroke of the platen. The downward or printing stroke of the platen causes a clockwise movement to be imparted to the shaft 173 (as viewed in Figs. 3 and 12) and likewise to the segmental gear member 174 attached thereto. Integral with the segmental gear member is an arm 200 which is provided with a roller 201 adapted, on the printing stroke of the platen, to move a slide 202 forwardly (to the left in Fig. 12) against the action of a tension spring 203.

The paper or work sheet is advanced by the feed rolls 140 during the movement of the platen into printing position. The arrangement of the link mechanism 205, connecting the operating bar 202 with the ratchet pawl, is such that the pawl will have completed its active stroke before the platen engages the work sheet. It will be noted from Fig. 12 that after the link reaches a position normal to the bar 202, the pawl will travel idly in a counter-clockwise direction about the ratchet, despite the fact that the bar continues to advance to the left. This movement occurs during the final downward movement of the platen arm as it moves into printing position, and therefore the work sheet is at rest when it is engaged by the platen. Consequent upon the forward movement of the bar 202, a link 205, which interconnects the bar with a lever 206 pivotally mounted on the shaft 126, rocks such lever causing a spring-pressed detent pawl, which engages a ratchet 209, to advance the ratchet, thereby rotating the shaft 126 to cause the feed wheels 140 to advance the work sheet.

As heretofore mentioned, the amount of movement imparted to the work sheet, by the feed wheels 140, is controlled by a distance block. As shown in Fig. 1, such distance block comprises a stepped member 210 secured as at 211 to the bar 202. Consequent upon the upward movement of the platen arm, the roller 201 is moved away from the end of the bar 202, permitting the spring 203 to move the bar rearwardly. During the rearward movement, the pawl 208 passes idly about the ratchet 209. Interposed in the path of the distance block 210 is a swinging lever 215 arranged to selectively engage, either the step 216, or the step 217 of the distance block, and limit the return movement of the bar 202, hence consequent upon the downward stroke of the platen the bar will be moved forward a predetermined distance.

The distance block shown in Fig. 1 has two steps 216 and 217, which are alternately engaged by the stop arm 215 and one of which, 217 serves to limit the advance of the paper between the impressions made from the same printing device, and the other of which serves to limit the advance of the paper between the impressions made from succeeding printing devices. It is obvious that either of these distances may be changed at will by merely providing a distance block having the desired steps, that shown is arranged for use with the printing devices and tabular formation of the work sheet shown in Figs. 6 and 8.

The stop 215 is alternately swung from the full line position shown in Fig. 1, to the dotted line position, while the bar 202 is at the forward end of its stroke. The stop 215 comprises a bell crank pivoted as at 218 to the frame 120, and has one arm 219 which engages the distance block, and a second arm 220, which is pivotally connected to one end of a link 221 slidably mounted as between a pair of rollers 222 carried by the frame 120. The link 221 is provided at its forward end with a cam roller 223 arranged to engage a cam 224 (Figs. 1 and 5), which is splined to and rotates with the shaft 161 heretofore described. This cam is so arranged that as the paper carriage 130 is moved outwardly the stop 215 is moved from the full line position Fig. 1 to the dotted line position, and vice versa when the paper carriage is moved towards the right. The distance block and cam mechanism just described is that used for two column listing. When three or more columns are to be made, from the same printing device, the distance block will be provided with as many shoulders as there are columns to be listed, and the cam 224 will be so arranged as to move the stop into engagement with the shoulders successively.

A suitable braking mechanism is associated with each of the paper feed wheels 140 to prevent an overthrow of the feeding action. As shown in Fig. 11, each paper feed wheel shaft 141 is mounted in suitable bearing 142 in the paper carriage member 131. Each shaft extends some distance to the right of the paper carriage and is provided with a friction disc 240, which has a splined connection 241 with the shaft. A compression spring 242 encircling each shaft, having one end arranged to engage a washer or disc 244 splined to the shaft and secured against outward movement by a suitable lock nut 245, and the other end arranged to engage the friction disc 240 forcing such disc into contact with a similar friction disc 248 which is free to rotate on the shaft and which abuts the face of the paper carriage member 131, thereby constantly maintaining sufficient braking action on the shaft 141 to prevent its overthrow at any time.

The platen is so arranged that on one impression it will coact with the bottom three lines on the printing device only, and on the next succeeding impression will coact with the top three lines only. This is controlled by the position of the pressure bars 48 heretofore mentioned in connection with the description of the platen. The pressure bars 48 are best illustrated in Figs. 2, 5, 9 and 10. As there shown three such bars are provided, each of which is rotatably journalled in the platen head 49.

Figure 9:
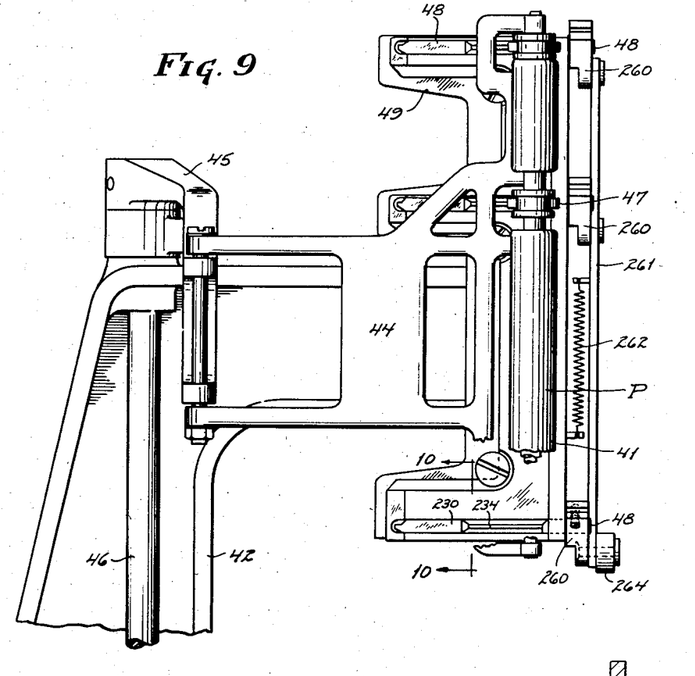
Fig. 9 is a bottom view of the platen mechanism.

As shown in Figs. 5 and 9, each pressure bar 48 extends forwardly from the platen head 49 and has secured to its outer end a crank arm 260. The crank arms of all pressure bars are joined by a common link member 261. A spring 262 normally acts on the link 261 to swing the pressure bars 48 in a clockwise direction, thereby normally maintaining the cam portion 234 in a position above the top three lines on the printing device, in which position the platen will function to print from the last three lines only. When the paper carriage 130 is moved to an extreme left-hand position, in which position the top three lines of the printing device are to be impressed, a cam arm 263 (indicated by dotted lines in Fig. 5) carried by the carriage 130 is disposed beneath a roller 264, carried at the right-hand edge of a bar 261. Hence, as the platen arm swings downwardly, the roller is urged into contact with the cam arm 263, causing the pressure bars 48 to be swung 90 degrees to bring the cam portion 233 into a position above the first three lines of the printing device and thereby cause such lines only, to be printed. Consequent upon the return or upward movement of the platen arm, the spring 262 repositions the pressure bars.

Figure 10:
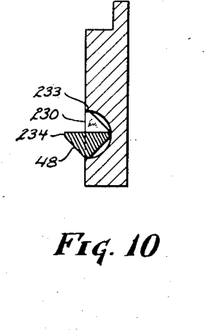
Fig. 10 is a sectional detail, the plane of the section being indicated by the line 10—10 on Fig. 9.

The pressure bars 48 are each cut away, as indicated at 230 and 231 in Fig. 10. The cut-away portion 230 normally overlies the top three lines on the printing device, and a cam portion 234 overlies the lower three lines, whereas, when the bar is swung in a counter-clockwise direction 90 degrees, a cam portion 233 overlies the top three lines and the cutaway portion 231 overlies the lower three lines of the printing device. Hence, as the bar is swung from one position to the other, the printing pressure may be applied only to that portion of the printing device superimposed by a cam portion 233 or 234 of the bar.

The pressure bars are swung from one position to the other consequent upon the downward movement of the platen arm, and the position of the bars is controlled by the position of the paper carriage. When the paper carriage is in its outermost position, printing pressure is desired only on the upper three lines of the printing characters, and when the paper carriage is in its withdrawn or right-hand position (Fig. 1) printing pressure is desired only on the lower three lines.

Figure 15:
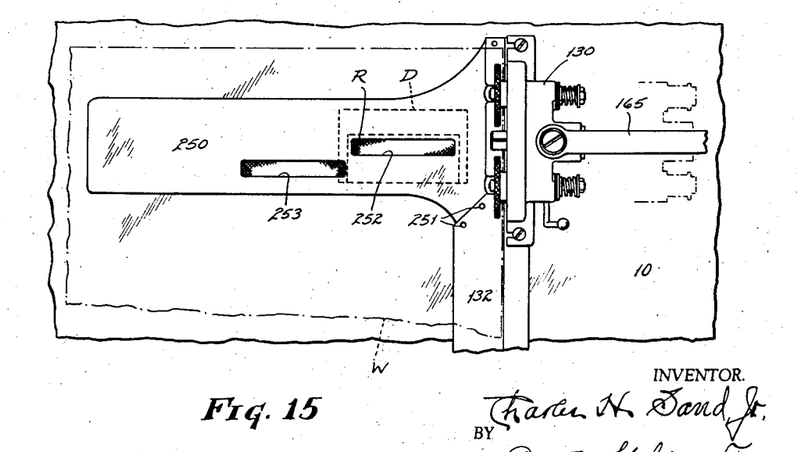
Fig. 15 is a plan view of a shield mechanism which may be used, if desired, to insure against smudging when certain types of paper are being impressed.

Fig. 15 illustrates a device which may be substituted when it is desired to eliminate the swing ing pressure bars 48 above described. In such instances, the pressure bars are removed and suitable rail members secured to the undersection of the platen head 49, such members coacting with the pressure rollers to cause the platen to print all of the printing lines on each of the printing devices at each operation of the platen arm. However, to prevent undesired lines from being impressed upon the work sheet, the shield 250 is provided. As shown in Fig. 15, the shield is secured to the paper guide 132, as at 251, and is arranged to move as a unit therewith.

The shield 250 is provided with cut-out areas 252 and 253, respectively. The cut-out area 252 is arranged so that it will lie over the first three lines of the printing plate when the carriage 130 is in its outermost position, as indicated by the full lines in Fig. 15. However, when the carriage is moved to the dotted line position, indicated in Fig. 15, the opening 253 in the plate 250 will be brought into position above the lower three lines of the printing device. In each instance the body portion of the plate 250 will act on the shield to prevent contact between the inking ribbon R, which lies between the printing device and the shield and through which the impression is made in the usual manner.

The lister mechanism is provided with an automatic stop, which is arranged to automatically stop the operation of the machine when the predetermined number of impressions have been made, and which number indicates that the limit of the worksheet has been reached. As heretofore mentioned, the bar 202 of the lister mechanism, (Fig. 1), is moved forwardly, once for each downward movement of the platen arm. This movement of the bar is utilized to advance a ratchet 280. A pivoted lever 281 is engaged and swung about its pivot by contact of a roller 282, carried by the lever, with the bar 202, each time the platen arm descends.

A suitable spring-pressed pawl 285 carried by the lever engages the ratchet and advances it a predetermined amount, depending upon the position of a set screw 286, which limits the return movement of the lever 281.

As the ratchet 280 is advanced, it swings the cam arm 290 in a counter-clockwise direction, and when a predetermined number of impressions have been made, the cam arm reaches the dotted line position as indicated in Fig. 1, in which position a cam member 292, carried by the arm, causes the depression of a switch member 293, making an electric circuit to energize a solenoid 294, the core of which is connected by a suitable link 295, with the clutch control link 112. Consequent upon the energization of the solenoid, the link 112 and bell crank 111 are swung to the position shown in Fig. 3, positioning the abutment 108 into the path of the latch 106 of the clutch mechanism, as heretofore described, and the operation of the entire mechanism, that is, the printing mechanism and the lister mechanism, will be stopped at the completion of the cycle of operation, whereupon the operator may provide the mechanism with a fresh worksheet and start the operation again by depressing the lever 111.

The work sheet guideway is provided with a spring-pressed roller 300 adjacent its forward end. Such roller is, as shown in Figs. 1 and 2, in position at a slight angle to the edge of the worksheet W and acts to maintain the worksheet in contact with the shoulder 136 of the paper guide. As shown in Fig. 2, the roller 300 is rotatably mounted on a stud 301, secured to a lever 302 pivotally mounted in a bracket 303, carried by the guideway. A suitable tension spring 304, interposed between the lever and the bracket, serves to resiliently maintain the roller 309 in contact with the work sheet W.

While the features of the method and apparatus for carrying it out have been specifically explained relative to the making of a two-column impression from a single column printing member, it is within the scope of the invention to make three or more column impressions from a single column printing member. In the latter instance the paper will be moved longitudinally and transversely a number of times equivalent to the number of columns of printing members, and each printing member will remain in the printing position until it has made a number of impressions equivalent to the number of columns desired. As heretofore mentioned, the number of impressions is readily controlled by substituting a ratchet having two shallow notches 76 disposed between each notch 75, for the duplicator ratchet 70 shown in Fig. 2. Thus the printing device will be fed only after three or more impressions have been made therefrom. The positioning of the work sheet for three or more columns is readily controlled by the substitution for the crank arm ratchet 168, shown in detail in Fig. 13, of a similar ratchet having a number of abutments or teeth equivalent to the number of columns desired. Such abutments, of course, are to be properly positioned so as to stop the movement of the carriage at the desired points. The feeding of the paper in a longitudinal direction is controlled as heretofore pointed out by the substitution for the distance block 210 (Fig. 1) a distance block having a number of steps equivalent to the number of columns to be listed, together with the use of a cam 224, so arranged that the stop member 219 will successively engage the various steps of the distance block. Thus, it will be seen that by comparatively simple substitutions the mechanism may be adjusted for listing 2, 3 or more columns.

I claim:

1. In combination with a printing machine having means to advance printing devices having a plurality of lines of printing characters one at a time into printing position, and a platen mechanism operative to make a predetermined number of impressions from each printing device, of a rotatable shaft, means operated by said platen mechanism to intermittently rotate said shaft, a paper carriage mounted for sliding movement axially of said shaft, means operated by said platen mechanism to intermittently slide said carriage on said shaft, said carriage including means to advance paper carried thereby relative to the printing device and to said carriage.

2. In combination with a printing machine having means to advance printing devices having a plurality of lines of printing characters one at a time into printing position, and a platen mechanism operative to make a predetermined number of impressions from each printing device, of a rotatable shaft, means operated by said platen mechanism to intermittently rotate said shaft, means to differentially control the amount of said rotation, a paper carriage mounted for sliding movement axially of said shaft, means operated by said platen mechanism to intermittently slide said carriage on said shaft, said carriage including means to advance paper carried thereby relative to the printing device and to said carriage, and means drivingly connecting the advancing means with said shaft.

3. In combination with a printing mechanism having means to advance printing devices one at a time to printing position, and a platen mechanism operative to make a predetermined number of impressions from each printing device, of movable means incorporated in said platen mechanism to cause the platen to print from different areas of the printing device dependent upon the position of such means, a paper carriage including a paper feeding and gripping means mounted for movement bodily relative to said platen, means operable by said platen mechanism to intermittently feed the paper relative to said carriage, means operable by said platen mechanism to intermittently move said paper carriage and paper bodily, and means carried by said paper carriage to position said movable means.

4. In combination with an addressing machine having means to advance address printing devices one at a time to printing position and a platen mechanism operative to make a predetermined number of impressions from each printing device, of means carried by said platen mechanism to cause the platen to print from different areas of the printing device, means carried by said platen mechanism and acting to cause the platen to normally print from a predetermined area, a paper carriage including a paper feeding and gripping means mounted for movement relative to said devices when in printing position, means acting on said feeding means to intermittently advance the paper relative to said carriage, means operable by said platen mechanism to intermittently move said paper carriage on said shaft, and means carried by said paper carriage and operative on said platen when the carriage is in a predetermined position to cause the platen to print from a different area of the printing device.

5. In combination with a printing machine having a main frame supporting mechanism to advance printing devices one at a time from a magazine to printing position, and a platen carrying arm adapted to bring a platen into operation to make a plurality of impressions from each printing device, of a housing detachably secured to the frame of the printing machine, a paper carriage, a work sheet guide mounted on said carriage and in close proximity to the main frame of the printing machine, a sheet gripping and feeding means carried by said carriage and operable to progress the sheet in said mechanism carried by said guide consequent upon the housing to operate said feeding means, means carried by said housing and connected to said carriage to intermittently move the carriage and guide bodily in a direction normal to the feeding direction of said sheet, and a unitary means carried by said housing and detachably connected with said platen arm to operate both said feeding and carriage moving means.

6. In combination with a printing machine having a main frame supporting mechanism to advance printing devices one at a time from a magazine to printing position, and a platen carrying arm adapted to bring a platen into operation to make a plurality of impressions from each printing device, of a housing detachably secured to the frame of the printing machine, a shaft rotatably carried by and projecting outwardly from said housing, a paper carriage mounted on said shaft for axial movement and extending exteriorly of said housing, a work sheet guide mounted on said carriage and in close proximity to the main frame of the printing machine, a sheet gripping and feeding means carried by said carriage and operable to progress the sheet in said guide consequent upon the rotation of said shaft, means carried by said housing and connected to said carriage to move the carriage axially of said shaft, a ratchet mechanism to intermittently operate said last named means, a second ratchet mechanism to intermittently rotate said shaft, a rock shaft, a connection between said rock shaft and both of said ratchet mechanisms, and an operating arm on said rock shaft adapted to be removably connected with the platen carrying arm.

7. In combination with a printing machine in which printing devices having a plurality of printed lines thereon are successively fed from a magazine into printing position one at a time and an impression made therefrom, of a platen movably mounted to make such impression, means carried by said platen to selectively print certain of the printing lines and not print certain of the printing lines and not print other lines, a paper carriage mounted on said machine, and means controlled by said paper carriage to select the lines of said printing device to be printed.

8. The combination of a printing mechanism, a carriage, coacting feeding and gripping means on the carriage adapted to engage the paper to be printed, means for moving the carriage, and means for operating the feeding means to feed the paper relative to the carriage, and a mask carried by said carriage and interposed between the paper to be printed and the printing device and selectively exposed to different portions of the printing device and the paper, dependent upon the position of the carriage.

9. The combination with a printing mechanism wherein data is transferable from a printing device having lines of printing characters arranged one above the other in a mutually fixed single column formation to an article, of a flat bed, an article gripping means acting parallel with the plane of the bed and adapted to hold said article flat on said bed, means to move the article in one direction relative to said gripping means and means to move the article and gripping means as a unit in another direction, the direction of one of said movements being parallel with the lines of characters on the printing device, and the direction of the other movement being normal to the lines of printing characters.

10. In combination with an addressing machine, wherein data is impressed from a preformed printing device onto a work sheet, of a rotatable shaft, a work sheet carriage supported by said shaft and movable axially thereon, means to prevent rotation of said carriage, means operative by the rotation of said shaft to move the work sheet relative to said carriage.

11. The combination with an addressing machine, wherein data is impressed from a preformed printing device onto a work sheet, of a rotatable shaft, a work sheet carriage movably supported by said shaft, means to prevent rotation of said carriage, means operative by the rotation of said shaft to move the work sheet relative to said carriage in a direction normal to said shaft, and means to move said carriage axially of said shaft.

12. The combination with a printing mechanism wherein data is transferable from a printing device having a plurality of lines of printing characters by a platen mechanism, of means to hold said printing device in a fixed position on a paper carriage, means to grip and progress the paper in said carriage, and means to move said paper and said gripping means bodily in a direction normal to the direction of progress of the paper in said paper carriage, and means carried by said platen mechanism and operative on contact with said carriage to print from a predetermined area of the printing device, and means to print from a second predetermined area of said printing device without moving said printing device with respect to said mechanism.

13. An attachment including a rotatable shaft, a paper carriage mounted for axial movement thereon, a paper guide carried by said carriage and adapted to hold said paper in a planular position, means to progress the paper along said guide consequent upon the rotation of said shaft, means to move said carriage along said shaft, and a common operating arm to rotate said shaft and move said carriage.

14. An attachment including a rotatable shaft, a paper carriage mounted for axial movement thereon, and adapted to hold a sheet of paper in a planular position, a paper guide carried by said carriage, means on said carriage to progress the paper along said guide consequent upon the rotation of said shaft, means including a crank mechanism to move said carriage along said shaft, and a common operating arm connected to rotate said shaft and operate said crank.

15. The combination in a series printing machine of a set of printing devices, each having mutually fixed lines of printing characters arranged in a predetermined relation to each other, means to make successive impressions from different portions of the same printing device, an article gripping means adapted to hold the article and also to move it, means to operate the gripping means to move the article in relation to the gripping means between successive impressions from different portions of the same printing device, and means to move the article and gripping means as a unit in another direction following the last impression from that printing device.

16. A printing mechanism of the kind wherein impressions from a number of printing plates are obtained on a single sheet having a printing bed fixed to the frame, the combination of a plate having mutually fixed lines of printing characters, means to move such plate along the bed, means to grip a sheet along one of its marginal edges whereby the same may be moved with respect to the printing bed and be positioned in a predetermined position with respect to said plate, means to make successive impressions on the sheet in different columns from different portions of the same printing plate, and means to operate the gripping means to move the sheet between such impressions in a direction up or down a column.

17. The combination in a printing machine of a printing device having a plurality of lines of printing characters, said lines being arranged in a fixed relation to each other, of an article gripping means adapted to hold the article in a planular position across all of said lines, means to move the article in said gripping means in one direction, means to move said article and gripping means as a unit in another direction, and means to print from different portions of the same printing device on different regions of the article.

18. The combination, in a printing mechanism, of a printing device having lines of printing characters arranged one above the other in a mutualy fixed single column formation, of an article holder adapted to engage the article along a margin extending parallel with the direction of feed and means to move the article in one direction relative to the article holder, and means to move the article and holder as a unit in another direction, the direction of one of said movements being normal to the lines of characters on the printing device and the other parallel with such lines, and means for simultaneously printing the characters of one line on one impression and the characters of another line on the same printing device in a succeeding impression.

19. The combination with a printing mechanism wherein data is transferable from a printing device having a plurality of mutually fixed lines of printing characters, of a paper carriage adapted to retain said paper in a planular position, means to grip and progress the paper in said carriage in a direction transverse to the printing lines, and means to move said paper and said gripping means bodily in a direction normal to the direction of progress of the paper in said paper carriage, said means also acting to effect a return movement of said paper and carriage, and means to make a plurality of impressions from different portions of the same printing device respectively.

20. The method of printing in multiple columns from a single column printing device having a plurality of mutually fixed parallel lines comprising mounting the paper to be printed in a shiftable paper holding device, moving the paper holding device with the paper in one direction, and moving the paper relative to the holding device in another direction, said latter movement sufficing to feed the paper an amount at least as great as the distance from one line to another of the printing device, and means for making a plurality of impressions from different lines of the same printing device respectively.

21. The combination of a mechanism adapted to print from a printing plate having a plurality of mutually fixed lines of characters thereon, means to grip and position the paper to be printed with respect to a predetermined area of said characters; means acting thereafter to position said paper for printing with respect to a second predetermined area of said printing characters, one of such positioning movements being transverse of the printing lines and the other parallel therewith, means to retain said printing plate stationary with respect to such mechanism during such second positioning operation, and means to make a plurality of impressions respectively from different lines of the same printing device.

22. The combination of a mechanism adapted to print from a printing plate having a plurality of mutually fixed lines of characters thereon, means to grip and position the paper to be printed with respect to a predetermined area of said characters, comprising a movable carriage, means carried by the carriage operable independently of movement of said carriage to move said paper with respect to said plate in the direction from line to line, and means to move the carriage with the paper in the direction of the length of the lines, and means to make a plurality of impressions respectively from different lines of the same printing device.

23. The combination of a mechanism adapted to print from a printing plate having a plurality of mutually fixed lines of characters thereon, means to grip and position the paper to be printed with respect to a predetermined area of said characters, comprising a carriage movable in one direction with respect to said printing plate and means carried by the carriage operable independent of movement of said carriage to move said paper in another direction with respect to said plate, and means to make a plurality of impressions respectively from different lines of the same printing device.

24. A printing mechanism, wherein data is transferable successively from different lines of a printing device having mutually fixed lines of printing characters arranged in a predetermined relation to each other to an article, and wherein the article holder includes gripping means, there being means to move the article in said gripping means in a direction transverse of the printing lines between successive impressions from the same printing device, and means to move said article and gripping means as a unit in a direction parallel with the printing lines, and means to make a plurality of impressions respectively from different lines of the same printing device.

CHARLES H. SAND, Jr.